P. Merrill,
Saw Clamp.
No. 101,754. Patented Apr. 12, 1870.
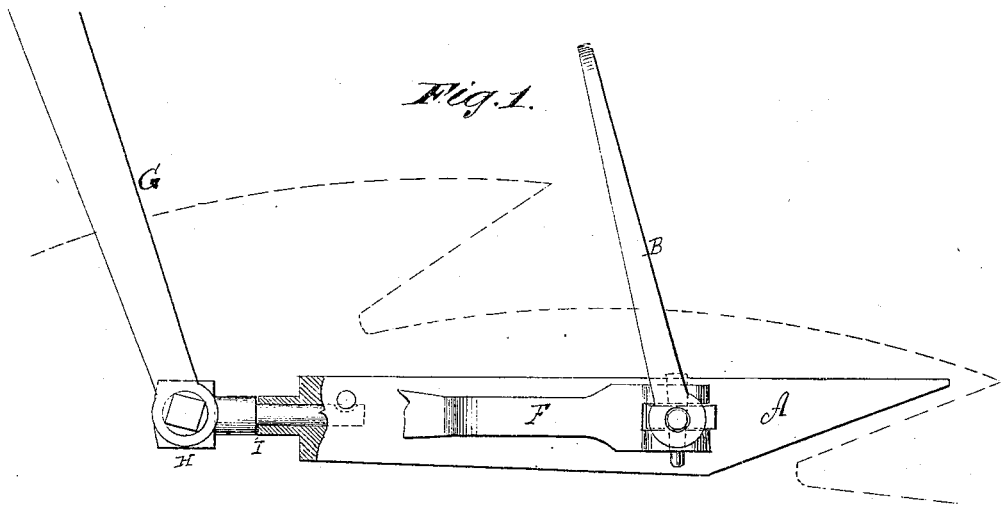
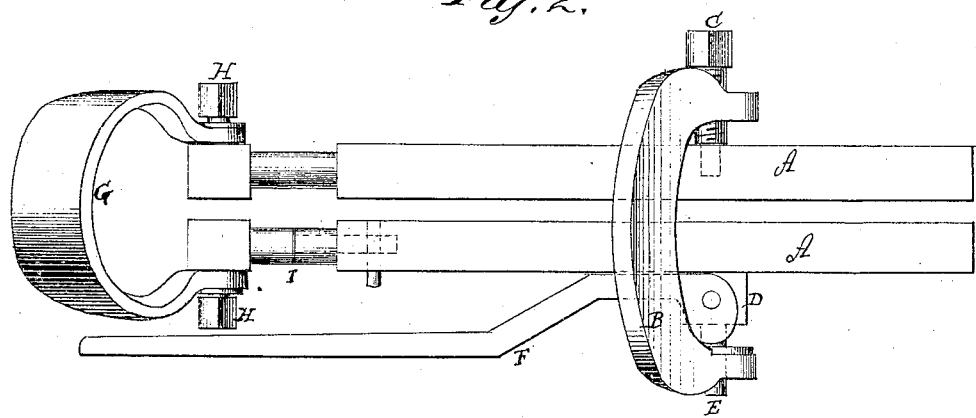
Witnesses:
John G. Becker
D. S. Mabie
Inventor:
P. Merrill
per Munn & Co.
Attorneys.

United States Patent Office.

PLATT MERRILL, OF PORT SANILAC, MICHIGAN.

Letters Patent No. 101,754, dated April 12, 1870.

IMPROVEMENT IN SAW-CLAMP.

The Schedule referred to in these Letters Patent and making part of the same.

*To all whom it may concern:*

Be it known that I, PLATT MERRILL, of Port Sanilac, in the county of Sanilac and State of Michigan, have invented a new and useful Improvement in Saw-Clamp; and I do hereby declare that the following is a full, clear, and exact description thereof, which will enable others skilled in the art to make and use the same, reference being had to the accompanying drawing forming part of this specification.

This invention relates to a new and useful device in a clamp for holding saws in the process of filing them, whereby files, as well as much time and annoyance, are saved; and It consists in the construction and arrangement hereinafter described.

In the accompanying drawing—

Figure 1 represents a side view of the clamp, as when applied to a circular saw, the latter being seen in dotted lines.

Figure 2 is a top or plan view of the same.

Similar letters of reference indicate corresponding parts.

A A represent two jaws, between which the saw is confined. These jaws are beveled on their under sides to correspond with the hook or face of the saw-tooth, as seen in fig. 1.

B is a shackle, to which the jaws are adjustably connected by means of a pivot-screw, C, on one side, and a plate, D, and pivot E on the other side.

F is an eccentric lever pivoted to the plate D, by means of which the jaws are clamped to the saw, after they have been properly adjusted by the screw C. By operating this lever F, the jaws are loosened from the saw in changing from one tooth to another.

G is a spring by means of which the ends of the jaws are connected, as seen at H H.

I is a swivel-joint in the shank of one of the jaws, which allows of the perfect adjustment of the jaws to the sides of the saw. By this arrangement the tooth of the saw is firmly held, so that the tooth may be sharpened to the extreme point without the vibration caused by the ordinary mode of filing, which vibration is not less destructive to files than disagreeable to the operator.

Having thus described my invention,

I claim as new and desire to secure by Letters Patent—

A clamp for filing saws, constructed and applied substantially as herein shown and described.

Witnesses:            PLATT MERRILL.
   THOMAS B. URN,
   ROBT. GOODWIN.